United States Patent
Amirthasamy et al.

(10) Patent No.: US 9,285,057 B2
(45) Date of Patent: Mar. 15, 2016

(54) METHODS AND APPARATUS FOR PROCESS DEVICE CALIBRATION

(71) Applicant: Fisher Controls International LLC, Marshalltown, IA (US)

(72) Inventors: Stanley Felix Amirthasamy, Ames, IA (US); James L. Snowbarger, Marshalltown, IA (US)

(73) Assignee: Fisher Controls International LLC, Marshalltown, IA (US)

(*) Notice: Subject to any disclaimer, the term of this patent is extended or adjusted under 35 U.S.C. 154(b) by 743 days.

(21) Appl. No.: 13/646,178

(22) Filed: Oct. 5, 2012

(65) Prior Publication Data

US 2014/0100673 A1  Apr. 10, 2014

(51) Int. Cl.
*G06F 11/30* (2006.01)
*F16K 37/00* (2006.01)

(52) U.S. Cl.
CPC ......... *F16K 37/0075* (2013.01); *F16K 37/0083* (2013.01)

(58) Field of Classification Search
CPC .................. F16K 37/0075; F16K 37/0083
See application file for complete search history.

(56) References Cited

U.S. PATENT DOCUMENTS

| 4,523,286 A | 6/1985 | Koga et al. |
| 4,951,224 A | 8/1990 | Hokynar |
| 2003/0202821 A1 | 10/2003 | Hayashi |
| 2006/0031001 A1* | 2/2006 | Snowbarger et al. ......... 701/114 |
| 2011/0048556 A1 | 3/2011 | Carter et al. |
| 2011/0077784 A1* | 3/2011 | Lips ............................. 700/283 |

FOREIGN PATENT DOCUMENTS

| EP | 0301568 | 2/1989 |
| GB | 2372087 | 8/2002 |
| GB | 2488369 | 8/2012 |
| WO | 9905576 | 2/1999 |

OTHER PUBLICATIONS

International Bureau, "International Preliminary Report on Patentability," issued in connection with International Patent Application No. PCT/US2013/063364, mailed Apr. 16, 2015 (8 pages).

(Continued)

*Primary Examiner* — Elias Desta
(74) *Attorney, Agent, or Firm* — Hanley, Flight and Zimmerman, LLC

(57) ABSTRACT

Methods and apparatus are disclosed for process device calibration. An example method includes determining if a first position of a process control device is a first end position, and in response to the first position being the first end position, calculating a second end position of the process control device based on the first end position and configuration information. The example method further includes calculating a partial stroke zone of the process control device based on the first end position and the second end position, and determining when a current position of the process control device is within the partial stroke zone. The example method also includes, when the current position is within the partial stroke zone, calculating an output bias based on a control signal and a summed value.

22 Claims, 6 Drawing Sheets

(56) References Cited

OTHER PUBLICATIONS

International Searching Authority, "International Search Report," issued in connection with International Patent Application No. PCT/US2013/063364, mailed Feb. 28, 2014 (3 pages).

International Searching Authority, "Written Opinion," issued in connection with International Patent Application No. PCT/US2013/063364, mailed Feb. 28, 2014 (6 pages).

Metso Automation, Inc., "Neles ValvGuard VG9000 Intelligent Safety Solenoid," Jan. 2014 (12 pages).

Metso Automation, Inc., "Neles ValvGuard VG9000F Installation, Maintenance and Operating Instructions," Revision 2.0, Jul. 2013 (48 pages).

Metso Automation, Inc., "Neles ND9000 Intelligent Valve Controller," Nov. 2013 (12 pages).

General Electric Company, "Masoneilan Products SVI II AP Advanced Performance Digital Valve Positioner," Oct. 2011 (16 pages).

General Electric Company, "Masoneilan Products SVI II AP Installation and Maintenance Manual," Revision G, 2012 (180 pages).

Metso Automation, Inc., "Neles ValvGuard VG9000—Improved Safety Cost Efficiently," retrieved from <http://www.metso.com/Automation/valve_prod.nsf/WebWID/WTB-090526-2256F-B6F95?OpenDocument#. UwU7UoUmy7E> on Feb. 14, 2014 (1 page).

Metso Automation, Inc., "Neles ND9100—Intelligent Valve Controller," retrieved from <http://www.metso.com/Automation/valve_prod.nsf/PrintView/5546C7BCD536517FC2257814003FEBDA?OpenDocument#. Uv5WU7QVyDA> on Feb. 14, 2014 (2 pages).

General Electric Company, "Masoneilan Products FPV110 Maintenance Manual," Revision B, Feb. 2012 (292 pages).

Yokogawa Electric Corporation, "YVP110 Advanced Valve Positioner," 1st Edition, Jul. 2000 (85 pages).

ABB Automation Products GMBH, "Electro-Pneumatic Positioner TZIDC, TZIDC-1x0, TZIDC-2x0 Configuration-, Parameterization Instruction," Revision C, Oct. 2009 (90 pages).

Samson AG, "Positioner with HART Communication Type 3780," Jan. 2006 (8 pages).

Flowserve Corporation, "Digital Positioner 3200MD User Instructions," 2011 (40 pages).

Flowserve Corporation, "Logix 3400MD Digital Positioner User Instructions," 2009 (106 pages).

Flowserve Corporation, "Logix 500si Series Digital Positioner Techincal Bulletin," 2005 (16 pages).

Flowserve Corporation, "D20 Compact Digital Positioner Product Information," 2008 (8 pages).

Flowserve Corporation, "APEX A9000 Digital Positioner Accord Controls," 2010 (8 pages).

Foxboro Eckardt GMBH, "SRD960 Universal Positioner and SRD 960T Position Transmitter for Ex d/Explosion Proof Application Product Specifications," Dec. 2011 (24 pages).

Tyco Flow Control, "Westlock ICoT 5000 Series Positioners," 2011 (12 pages).

\* cited by examiner

METHODS AND APPARATUS FOR PROCESS DEVICE CALIBRATION

FIELD OF THE DISCLOSURE

This disclosure relates generally to process control systems, and, more particularly, to methods and apparatus for process device calibration.

BACKGROUND

Processes such as, for example, industrial processes are usually controlled by a variety of process control devices such as actuators and pneumatic valves. During operation, instruments connected to these process control devices may need to be calibrated and/or recalibrated. For example, when a new valve positioner is installed, the positioner may be calibrated for use with the valve to ensure accurate operation of the valve. In some cases, calibrating a valve positioner requires stroking the valve to which the positioner is operatively coupled from one end position (e.g., a fully closed position) to the other end position (e.g., a fully open position). To properly calibrate the positioner, the valve may need to be taken offline. However, this is not always possible because some process plants operate continuously and/or the valve does not include a bypass. In some known systems, calibrating a positioner may additionally or alternatively require a person or user to input information. However, such user inputs to the positioner introduce an opportunity for error during calibration.

SUMMARY

An example method includes determining if a first position of a process control device is a first end position and, in response to the first position being the first end position, calculating a second end position of the process control device based on the first end position and configuration information. The example method further includes calculating a partial stroke zone of the process control device based on the first end position and the second end position, and determining when a current position of the process control device is within the partial stroke zone. The example method also includes, when the current position is within the partial stroke zone, calculating an output bias based on a control signal and a summed value.

An example apparatus includes a memory and a processor coupled to the memory including instructions. The example apparatus also includes instructions in the memory to cause the processor to determine if a first position of a process control device is a partial stroke position of the process control device and, in response to the first position being the partial stroke position, to calculate a target output pressure based on configuration information. The example apparatus also includes instructions in the memory to cause the processor to determine whether a feedback pressure is equal to the target pressure, where the feedback pressure corresponds to an output pressure output from the process control device. The example apparatus also includes instructions in the memory to cause the processor to calculate a difference between the target output pressure and the feedback pressure and to change the output pressure by the difference.

An example tangible computer readable storage medium includes instructions to cause a machine to determine if a first position of a process control device is a first end position and, in response to the first position being the first end position, to cause the machine to calculate a second end position of the process control device based on the first end position and configuration information. The example tangible computer readable storage medium also includes instructions to cause the machine to calculate a partial stroke zone of the process control device based on the first end position and the second end position. The example tangible computer readable storage medium also includes instructions to cause the machine to determine when a current position of the process control device is within the partial stroke zone and, when the current position is within the partial stroke zone, to cause the machine to calculate an output bias based on a control signal and a summed value.

DETAILED DESCRIPTION

Figure 1:
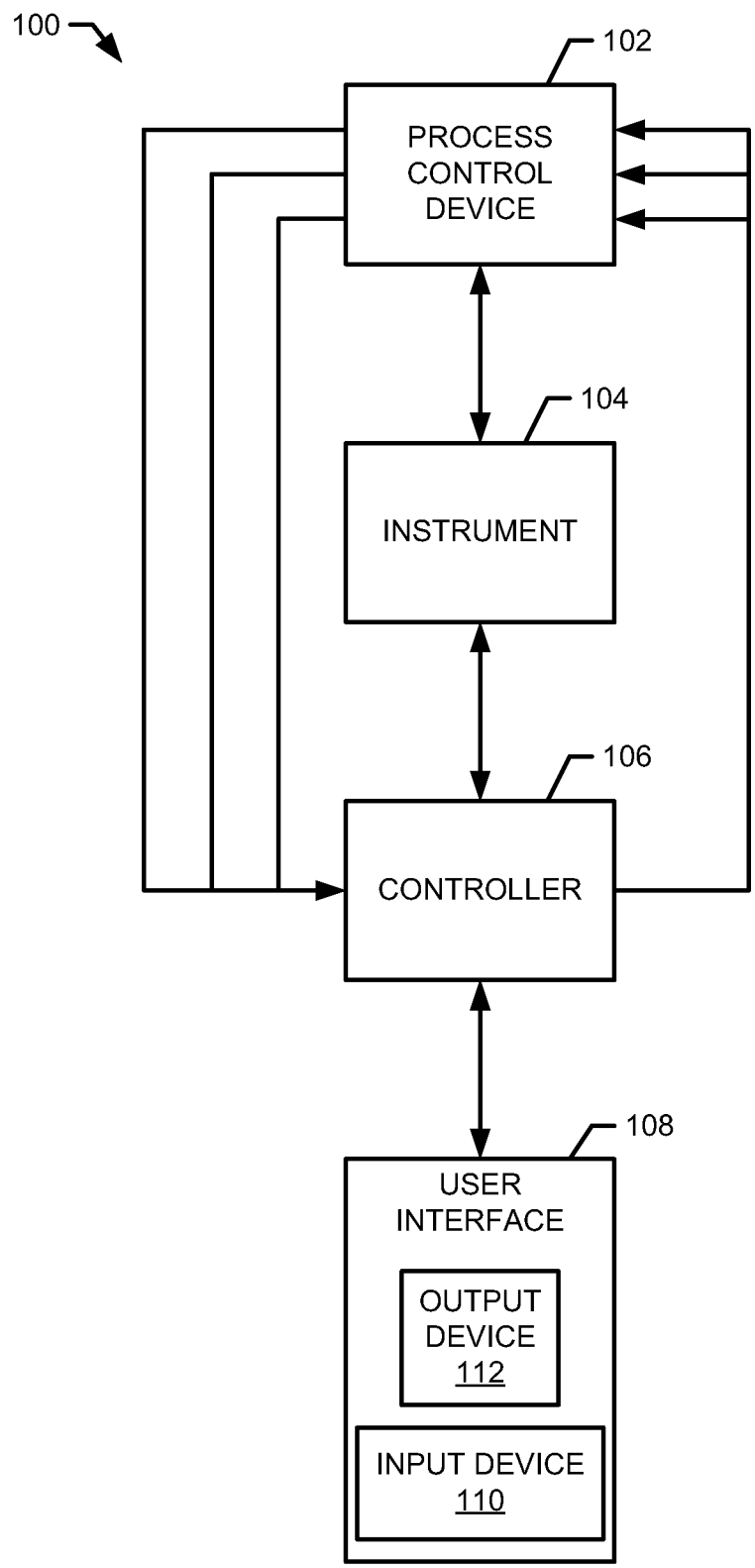
FIG. 1 illustrates an example process control system within which the teachings of this disclosure may be implemented.

Certain examples are shown in the above-identified figures and described in detail below. In describing these examples, like or identical reference numbers are used to identify the same or similar elements. The figures are not necessarily to scale and certain features and certain views of the figures may be shown exaggerated in scale or in schematic for clarity and/or conciseness. Additionally, several examples have been described throughout this specification. Any features from any example may be included with, a replacement for, or otherwise combined with other features from other examples.

The examples described herein relate to calibrating an instrument such as a position controller or positioner of a process control device such as a valve assembly without requiring a process control system within which the instrument is operating to be taken offline or otherwise affected and without requiring user input (e.g., automatically). In particular, the examples described herein may be used to automatically calibrate an instrument such as a positioner to a valve assembly (e.g., a pneumatic valve and a pneumatic actuator) by collecting information about the valve assembly. For example, an instrument (e.g., a positioner) upon being coupled to an actuator assembly, may automatically collect information regarding a type of the actuator to which it is coupled, a pressure range needed to control the actuator, a percent of travel or degrees of rotation, whether a low current or voltage input corresponds to a closed position or an open position, etc. This information enables the instrument to properly adjust or calibrate the output signal from the instrument to the valve assembly to ensure the control system signal from the controller corresponds to the feedback signal received from a position sensor of the valve assembly. The calibration process may also be user initiated. Additionally, by enabling the instrument to automatically collect the above-noted information without requiring user input, the opportunity for error due to user input during calibration decreases.

In some examples, once the instrument is installed and connected to process control devices such as a valve assembly, the instrument operatively interposes between the valve assembly and a controller (e.g., a control system such as a distributed control system (DCS)). Specifically, the instrument receives a control signal from the controller and outputs a corresponding pressure to operate or control the valve assembly. In operation, the instrument collects information from the valve assembly (e.g., the type of actuator, the pressure range, the range of the travel sensor, the stroke length of the valve, etc.) using wired or wireless communications (e.g., with a radio frequency identification (RFID) device (e.g., a tag)). This information may then be stored in a storage device (e.g., a nonvolatile memory) and used in calculations to perform calibration, such as to calculate expected values (e.g., an expected valve position) and/or to calculate adjustments based on comparisons to the expected values.

In some examples, the instrument may be installed and connected to process control devices such as a valve assembly when the valve is at one end of travel (e.g., a fully open or fully closed position). In some such instances, the instrument may automatically perform a calibration in a travel control mode in which a feedback signal representative of the position of the valve is used to control the valve. In other examples where the valve is not at an end of travel when the instrument is installed, the instrument may automatically perform a calibration in a pressure control mode in which the instrument uses a feedback signal representative of the actuator pressure to control the position of the valve.

For examples in which the instrument is in the travel control mode, the instrument calculates the other end position (e.g., the other of the fully open position or the fully closed position) using stroke length information collected from the valve assembly, details of the travel feedback mechanism and also calculates a partial stroke position and/or a partial stroke zone (i.e., a range of partial stroke positions). In operation, when the valve position is in the partial stroke zone, the control system signal and an instrument integrator accumulation score remain substantially constant, the instrument adjusts the output bias by the instrument integrator accumulation score and then resets the instrument integrator accumulation score to zero. The instrument integrator accumulation score is a value calculated by an integrator in the instrument that indicates the adjustments the integrator made to match the valve position to the control system signal. The instrument also stores the new output bias in the storage device to complete calibration without having to take any process controlled at least in part by the valve assembly off-line or otherwise affect the process.

In other examples when the valve is not at an end of travel upon installation, the instrument performs a series of operations to match the feedback pressure signal to a calculated target output pressure signal while in the process control mode. While monitoring the feedback pressure signal, the instrument increases and decreases the output pressure until a direction of travel motion is detected. Based on the current valve travel, the control valve travel span and the travel feedback information, the instrument calculates the ends of travel and a partial stroke position or a partial stroke zone. The instrument also modifies the rate of the control system signal change to modify how the valve operates when the control system signal is within a cutoff region and then switches to the travel control mode. Using the instrument integrator accumulation score, the instrument adjusts the output bias when the instrument integrator accumulation score and the control system signal are substantially constant. Once an end of travel control system signal is entered, the instrument makes an adjustment to the calculated end positions and then resets the rate of change of the control system signal to complete calibration of the instrument.

FIG. 1 illustrates an example process control system 100 that may be used to implement the example methods and apparatus disclosed herein. In the illustrated example of FIG. 1, a process control device 102, an instrument 104, a controller 106 and a user interface 108 may communicate via, for example, wired or wireless links. In particular, the example process control device 102, the example instrument 104 and/or the example controller 106 of FIG. 1 may communicate via a data bus (e.g., FOUNDATION Fieldbus™, HART™, Profibus™, Modbus™, Devicenet™, etc.) or a Local Area Network (LAN).

The instrument 104 of FIG. 1 receives a control system signal from the controller 106 and transmits an adjusted output signal (e.g., a pressure) to the process control device 102. The instrument 104 may be a digital valve positioner (DVP) and/or a digital valve controller (DVC). Alternatively, the instrument 104 and the controller 106 may be combined and/or integrated into, for example, a DeltaV™ controller.

The controller 106 outputs control system signals based on information received and/or collected from the process control device 102, the instrument 104 and/or the user interface 108. In some examples, the controller 106 also communicates information (e.g., instructions) to the instrument 104 and/or outputs information (e.g., alert messages) to the user interface 108.

The example process control device 102 of FIG. 1 may be any number of input devices and/or output devices. In some examples, the input device includes a valve assembly (e.g., a pneumatic valve and a pneumatic actuator) and/or other devices and the output devices include valve positioners, valve controllers and/or other devices.

The example user interface 108 of FIG. 1 is any device that processes inputs and outputs such as, for example, a computer, a workstation, a server, and/or a mobile device, etc. User input may be communicated to the user interface 108 by the input device 110 such as, for example, a keyboard, a stylus pen, a mouse, and/or a touch screen, etc. Output from the user interface 108 may be communicated to the user by the output device 112 such as, for example, a monitor (e.g., displaying an alert message) and/or speaker (e.g., emitting an audible alert), etc.

Although a single example instrument 104 and example controller 106 are shown in FIG. 1, one or more additional instruments 104 and/or controllers 106 may be included in the example process control system 100 of FIG. 1 without departing from the teachings of this disclosure.

Figure 2:
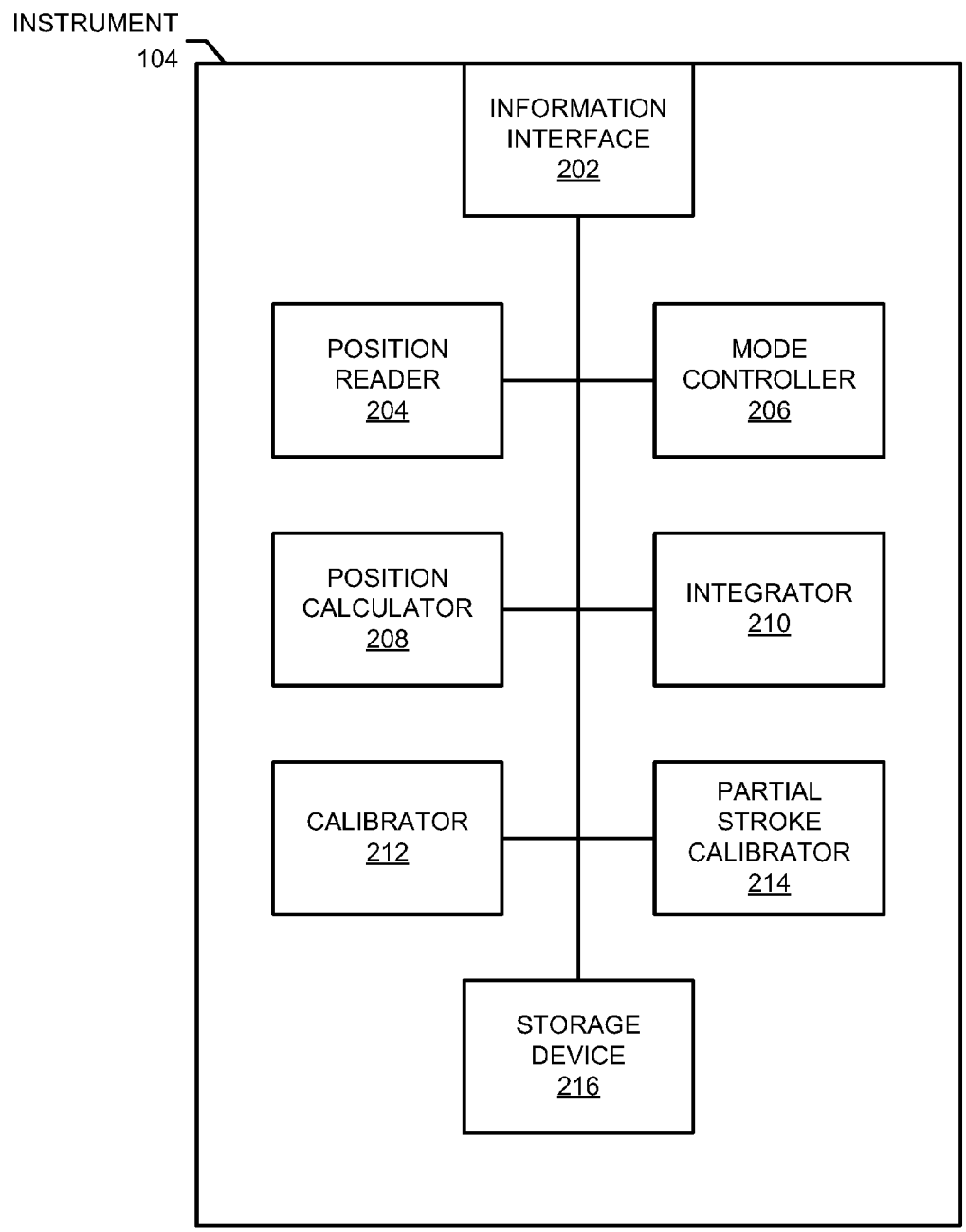
FIG. 2 is a block diagram of an example implementation of the instrument of FIG. 1.

FIG. 2 is a block diagram of an example implementation of the instrument 104 of FIG. 1. In the illustrated example, the instrument 104 is calibrated to a process control device, such as a valve assembly, to ensure accurate operation of the process control device within a process. The instrument 104 (e.g., a positioner such as a digital valve positioner or a digital valve controller) includes an information interface 202, a position reader 204, a mode controller 206, a position calculator 208, an integrator 210, a calibrator 212, a partial stroke calibrator 214 and a storage device 216.

When installed (e.g., operatively coupled to a process control device and to a controller), the instrument 104 automatically collects information regarding the process control device to which it is coupled via the information interface 202. The calibration process of the instrument may also be manually initiated. For example, the instrument 104 may collect from a valve assembly (e.g., a valve and an actuator) information relating to the valve and the actuator such as the type of actuator (e.g., a pneumatic actuator), an actuator pressure range (e.g., 3 psi-15 psi), a stroke length of the valve (e.g., two inches), range of a travel sensor, a relay offset, etc., via the information interface 202. In some examples, the information interface 202 collects the above-noted information via a radio frequency identification (RFID) device (e.g., a tag). In other examples, the information interface 202 collects the information via a barcode reading device or via Bluetooth. However, the information may be transferred from the process control device to the instrument 104 using any other suitable technology. Additionally, in some instances, a user may input the information directly to the instrument 104 via, for example, an input interface (e.g., a keyboard or a handheld device) included in the information interface 202. In some examples, the information interface 202 records the collected information in a register, a local memory and/or a storage device such as the storage device 216. In some examples, the storage device 216 is a non-volatile memory. As described in more detail below, the recorded information may be used in calculations to perform a calibration, such as to calculate adjustments based on comparisons to an expected value.

In some examples, the information interface 202 determines whether the storage device 216 previously recorded information regarding a process control device. When the storage device 216 includes previously recorded information, the information interface 202 compares the newly received information to the previously recorded information. When the newly received information and the previously recorded information are the same, the information interface 202 outputs an indication that the instrument 104 was previously calibrated and is still calibrated to the process control device. Conversely, when the storage device 216 does not contain previously recorded information or the previously recorded information is not the same as the new information, the information interface 202 outputs an indication to continue calibrating the instrument 104 to the process control device. In some examples, the information interface 202 may output an indication that it is safe to calibrate the process control device.

In the illustrated example, the instrument 104 also determines whether a valve is at one end of travel (e.g., a fully open or fully closed position) when installed. For example, the position reader 204 receives a control system signal from a controller (e.g., a control system such as a distributed control system (DCS) and/or the example controller 106). The position reader 204 also receives from the storage device 216 the output range of the controller. For example, the controller 106 may operate over a 4 milliamp to 20 milliamp (mA) range. In the illustrated example, the position reader 204 compares the control system signal to the range and determines whether the valve is at an end of travel. For example, a control system signal of 4 mA or 20 mA corresponds to the valve position being at an end of travel, while a control system signal between 4 mA and 20 mA indicates the valve position is not at an end of travel. In the illustrated example, because the instrument is installed while under manual control (e.g., a user holds the valve in one position to replace the instrument), the instrument is able to rely on the comparison of the control system signal to the range to determine whether the valve position is at an end of travel. In some examples, the position reader 204 records the position of the valve in a register, a local memory and/or the example storage device 216.

In some examples, the position reader 204 receives a feedback signal representative of the position (e.g., a travel feedback signal) of a process control device from a sensor operatively coupled to the process control device. For example, a travel sensor operatively coupled to a valve assembly may communicate a travel feedback signal received by the position reader 204.

In the illustrated example of FIG. 2, the mode controller 206 receives an indication of the position and uses this position indication to determine an operating mode of the example instrument 104. For example, the mode controller 206 receives a position indication of the process control device from the control system signal corresponding to an end of travel. In some examples, when the position of the process control device (e.g., the valve assembly) is at an end of travel (e.g., a fully open or fully closed position), the instrument 104 performs a calibration in a travel control mode in which a feedback signal representative of the position of the valve is used to control the valve. In other examples where the valve is not at an end of travel, the instrument 104 performs a calibration in a pressure control mode in which the instrument 104 uses a feedback signal representative of pressure provided to an actuator to control position of the valve.

The position calculator 208 calculates a position of a process control device using, for example, information collected from the process control device (e.g., the stroke length of a valve). For example, the position calculator 208 receives an indication from the mode controller 206 that the instrument 104 is operating in the travel control mode. Using stroke length information collected from, for example, a valve assembly, the position calculator 208 uses the known end position from the position reader 204 and calculates the other end position (e.g., the other of the fully open position or the fully closed position). In some examples, the position calculator 208 calculates a partial stroke position and/or a partial stroke zone (e.g., a range including the partial stroke position) based on the known end position and the other end position. For example, the position calculator 208 calculates a mid-stroke position using the two end positions of the valve and calculates the partial stroke zone as within, for example, two percent of the mid-stroke position (e.g., plus or minus two percent of the mid-stroke position). In some examples, the position calculator 208 records the partial stroke zone in a register, a local memory and/or the example storage device 216.

In some examples, the position calculator 208 receives a control system signal from a controller such as the example controller 106 of FIG. 1. In the illustrated example, the position of the process control device corresponds to the control system signal, which may be collected by the information interface 202 when the instrument 104 is installed. Using the control system signal, the known range of the control system signal and stroke length information collected from the process control device (e.g., the example process control device 102), the position calculator 208 calculates an expected position of the process control device 102. For example, the position calculator 208 may receive a 12 mA control system signal from the controller 106, receive information from the storage device 216 that the range of the control system signal from the example controller 106 is 4-20 mA, and information indicating the stroke length of the process control device 102 is two inches. In that case, the position calculator 208 compares the control system signal (12 mA) to the range of the control system signal (4-20 mA) and calculates the position (e.g., expected position) of the process control device to be at the mid-stroke position (e.g., at fifty percent of the maximum travel).

In the illustrated example of FIG. 2, the integrator 210 monitors the positions corresponding to the control system signal and the travel feedback signal and indicates when the two positions are equal. The integrator 210 calculates the difference between the expected position and the current position and adds the difference to an instrument integrator accumulation score. The integrator 210 sums the calculated differences until the two positions are equal (e.g., the difference is zero). Thus, the instrument integrator accumulation score represents an adjustment to minimize the difference during the next calculation. The instrument integrator accumulation score indicates the two positions are equal when the value of the instrument integrator accumulation score does not change (e.g., adding zeros). The instrument integrator accumulation score is stored in the storage device 216. In some examples, the instrument integrator accumulation score is reset (e.g., set to zero) once the instrument integrator accumulation score is recorded.

In the illustrated example of FIG. 2, the calibrator 212 calculates an adjustment to the output bias needed to complete calibration of an instrument to a process control device. When the valve position is within the partial stroke zone, the control system signal and the instrument integrator accumulation score are substantially constant, the output bias (e.g., an adjustment to the control system signal to match the control system signal and the travel feedback signal) is adjusted based on the instrument integrator accumulation score and the integrator 210 is set (or reset) to zero. The calibrator 212 does not attempt to calculate an output bias while the control system signal is changing and/or the current position does not match the position corresponding to the control system signal and the instrument integrator accumulation score is changing. The new output bias value is then stored in the storage device 216 to complete calibration of the example instrument 104 to the process control device.

In the illustrated example, when the mode controller 206 determines the position of the process control device 102 is not at end of travel, the mode controller 206 initiates the partial stroke calibrator 214. The partial stroke calibrator 214 performs a calibration in a pressure control mode. As described below in connection to FIG. 3, while instrument 104 is in the pressure control mode, the instrument 104 performs a calibration using feedback pressure signals rather than travel feedback signals.

Figure 3:
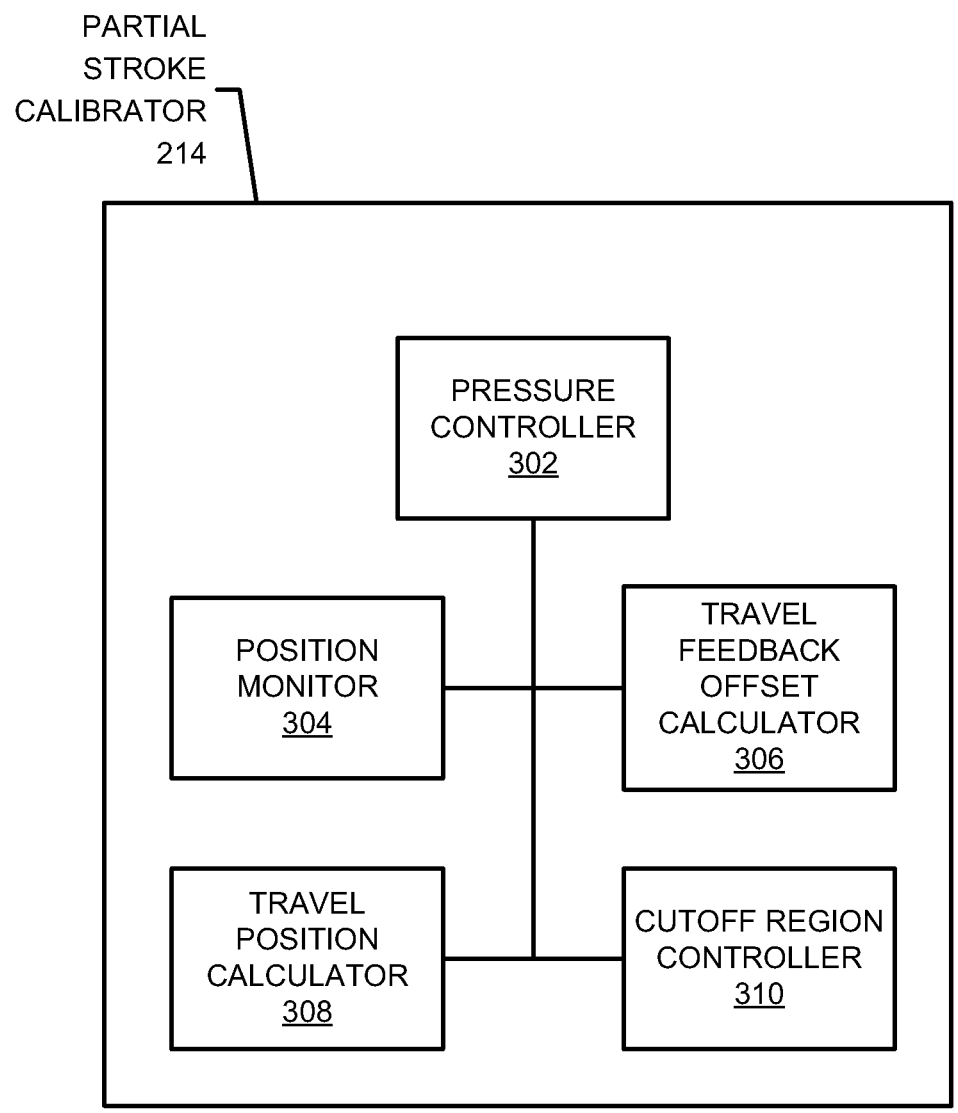
FIG. 3 is a block diagram of an example implementation of the partial stroke calibrator of FIG. 2.

FIG. 3 is a block diagram of an example implementation of the partial stroke calibrator 214 of FIG. 2. In the illustrated example, the partial stroke calibrator 214 modulates the output pressure without regard to the travel feedback signal received by the instrument 104. By doing so, the instrument 104 controls the pressure received by the process control device 102 and makes adjustments to correct any variance between a target output pressure and the feedback pressure signal. For example, the output pressure from the instrument 104 may be different than the pressure received by the process control device 102 due to properties of the process control system. For example, the distance between the instrument 104 and the process control device 102 may cause the output pressure to be different than the pressure received by the process control device 102. The partial stroke calibrator 214 includes a pressure controller 302, a position monitor 304, a travel feedback offset calculator 306, a travel positions calculator 308 and a cutoff region controller 310.

When performing a calibration in the pressure control mode, the example pressure controller 302 controls the pressure received by the process control device 102 (e.g., the valve assembly). For example, by receiving the stored pressure range of the valve assembly from the storage device 216, the pressure controller 302 can calculate an output signal (e.g., a target output pressure) corresponding to a control system signal received by the instrument 104. For example, when the received actuator pressure range is 3-15 psi and the instrument 104 receives a 4 mA control system signal (e.g., from the controller 106), the pressure controller 302 calculates a 3 psi target output pressure. Additionally, when performing a calibration, the pressure controller 302 may increase and/or decrease the output pressure to determine whether the new output pressure causes the position of the valve to change.

The position monitor 304 detects any changes in the process control device 102 (e.g., the position of the valve) based on the output pressure. For example, the position monitor 304 monitors the valve position while the pressure controller 302 increases the output pressure. Alternatively, the position monitor 304 may monitor the valve position while the pressure controller 302 decreases the output pressure. When a change in the valve position is detected, the position monitor 302 records the direction of change in the valve position and the output pressure causing the change. In some examples, position monitor 304 may estimate the dead band (e.g., a signal range over which no position change is detected) and/or friction level of the valve assembly while monitoring the output pressure and the valve position.

In the illustrated example of FIG. 3, the position monitor 304 determines whether the output pressure exceeds a safety margin calculated for the process control device 102. For example, an output pressure exceeding the safety margin may indicate a component in the process control system is malfunctioning. When the output pressure exceeds the safety margin, the partial stroke calibrator 214 aborts calibration and generates an alert or alarm.

The example travel feedback offset calculator 306 calculates an average output pressure (e.g., average signal) based on the output pressures recorded by the position monitor 304. The travel feedback offset calculator 306 compares the average output pressure to the actuator pressure range and estimates a valve position. The travel feedback offset calculator 306 also calculates the current valve position based on the travel feedback signal and a default travel offset of zero. The difference between the estimated valve position and the current valve position is recorded (e.g., stored in the storage device 216) as the travel feedback offset. The travel feedback offset is an adjustment the instrument 104 makes to the output pressure so that the valve position corresponding to the output pressure matches the valve position received from, for example, the travel feedback signal by a travel sensor coupled to the process control device 102.

In the illustrated example, the travel position calculator 308 calculates the fully open and fully closed positions of the process control device 102 using the current position, the stroke length of the valve, the actuator pressure range, and the travel feedback offset. As described above, the output pressure corresponds to a valve position. By adjusting the current position by the travel feedback offset, the travel position calculator 308 calculates the output pressure corresponding to the valve position. The valve position can then be compared to the stroke length of the valve to determine an end position of the valve. Using the corresponding actuator pressure range, the travel position calculator 308 calculates the output pressure corresponding to the end position. The travel position calculator 308 uses the end position to calculate the other end position and the corresponding output pressure.

In the illustrated example, while the instrument 104 performs a calibration, the cutoff region controller 310 determines how the process control device operates when the control system signal is within the cutoff region. The cutoff region is used to prevent, for example, valve seat erosion that occurs when the valve is left partially open when the valve position should be in the fully closed position. Accordingly, when the control system signal is within the cutoff region, the cutoff region controller 310 modifies the control system signal so that the valve position is in the fully open or fully closed position. During normal operation (e.g., not performing a calibration), the rate of control system signal change is sharp when the control system signal reaches the cutoff region. This is done because the instrument 104 is calibrated and the instrument 104 has calculated a correlation between the travel feedback signal and the control system signal. In other words, the end position is known and the instrument 104 can accurately identify the output corresponding to the end position without, for example, a valve plug impacting a valve seat in the process control device 102.

However, while performing an instrument calibration when the instrument 104 is in a partial stroke zone, the control system signal correlation to the travel feedback signal is unknown (e.g., the calculated end points at the ends of travel may be inaccurate). In the illustrated example, the cutoff region acts as a buffer to prevent, for example, the valve plug from impacting the seat and possibly damaging related components. Thus, the cutoff region calculator 310 modifies the rate of control system signal change to a relatively more gradual rate of change and thereby preventing the valve plug from accidentally impacting the seat due to inaccurately calculated end points.

In the illustrated example, the cutoff region is calculated using a predetermined percentage. For example, applying a five percent (5%) cutoff region to a control system signal range of 4-20 mA, the cutoff region calculator 310 calculates the closed cutoff region (4-4.8 mA) and the open cutoff region (19.2-20 mA). During normal operation (e.g., not performing a calibration), when the control system signal is within either of the cutoff regions (e.g., the control system signal is at 4.7 mA), the instrument 104 changes the control system signal from 4.7 mA to 4 mA very sharply (e.g., causes the actuator to suddenly vent all the air in the actuator). Due to the known and calibrated fully closed end position, the instrument 104 guides the valve plug to the fully closed position without slamming into the valve seat (e.g., the instrument 104 stops the valve plug at the calibrated fully closed position). However, during calibration, the cutoff region controller 310 gradually changes the control system signal from 4.7 mA to 4 mA, thereby avoiding the valve plug impacting the valve seat due to higher velocity than expected when entering the seat.

The instrument then switches from the pressure control mode to the travel control mode. As a result, the instrument 104 uses the travel feedback signal as the primary feedback to calculate the output bias. In some examples, the position calculator 208 calculates a set point equal to the position corresponding to the travel feedback signal and then gradually changes the set point to match the control system signal, thereby enabling a bumpless switch from the pressure control mode to the travel control mode.

While an example manner of implementing the process control system 100 has been illustrated in FIGS. 1-3, one or more of the elements, processes and/or devices illustrated in FIGS. 2 and 3 may be combined, divided, re-arranged, omitted, eliminated and/or implemented in any other way. Further, the example position reader 204, the example mode controller 206, the example position calculator 208, the example integrator 210, the example calibrator 212, the example partial stroke calibrator 214, the example pressure controller 302, the example position monitor 304, the example travel feedback offset calculator 306, the example travel position calculator 308, the example cutoff region controller 310 and/or, more generally, the example process control system 100 of FIGS. 1-3 may be implemented by hardware, software, firmware and/or any combination of hardware, software and/or firmware. Thus, for example, any of the example position reader 204, the example mode controller 206, the example position calculator 208, the example integrator 210, the example calibrator 212, the example partial stroke calibrator 214, the example pressure controller 302, the example position monitor 304, the example travel feedback offset calculator 306, the example travel position calculator 308, the example cutoff region controller 310 and/or, more generally, the example process control system 100 of FIGS. 1-3 could be implemented by one or more circuit(s), programmable processor (s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example, the example position reader 204, the example mode controller 206, the example position calculator 208, the example integrator 210, the example calibrator 212, the example partial stroke calibrator 214, the example pressure controller 302, the example position monitor 304, the example travel feedback offset calculator 306, the example travel position calculator 308 and/or the example cutoff region controller 310 are hereby expressly defined to include a tangible computer readable medium such as a memory, DVD, CD, Blu-ray, etc. storing the software and/or firmware. Further still, the example process control system 100 of FIGS. 1-3 may include one or more elements, processes and/or devices in addition to, or instead of, those illustrated in FIGS. 1-3, and/or may include more than one of any or all of the illustrated elements, processes and devices.

Figure 4:
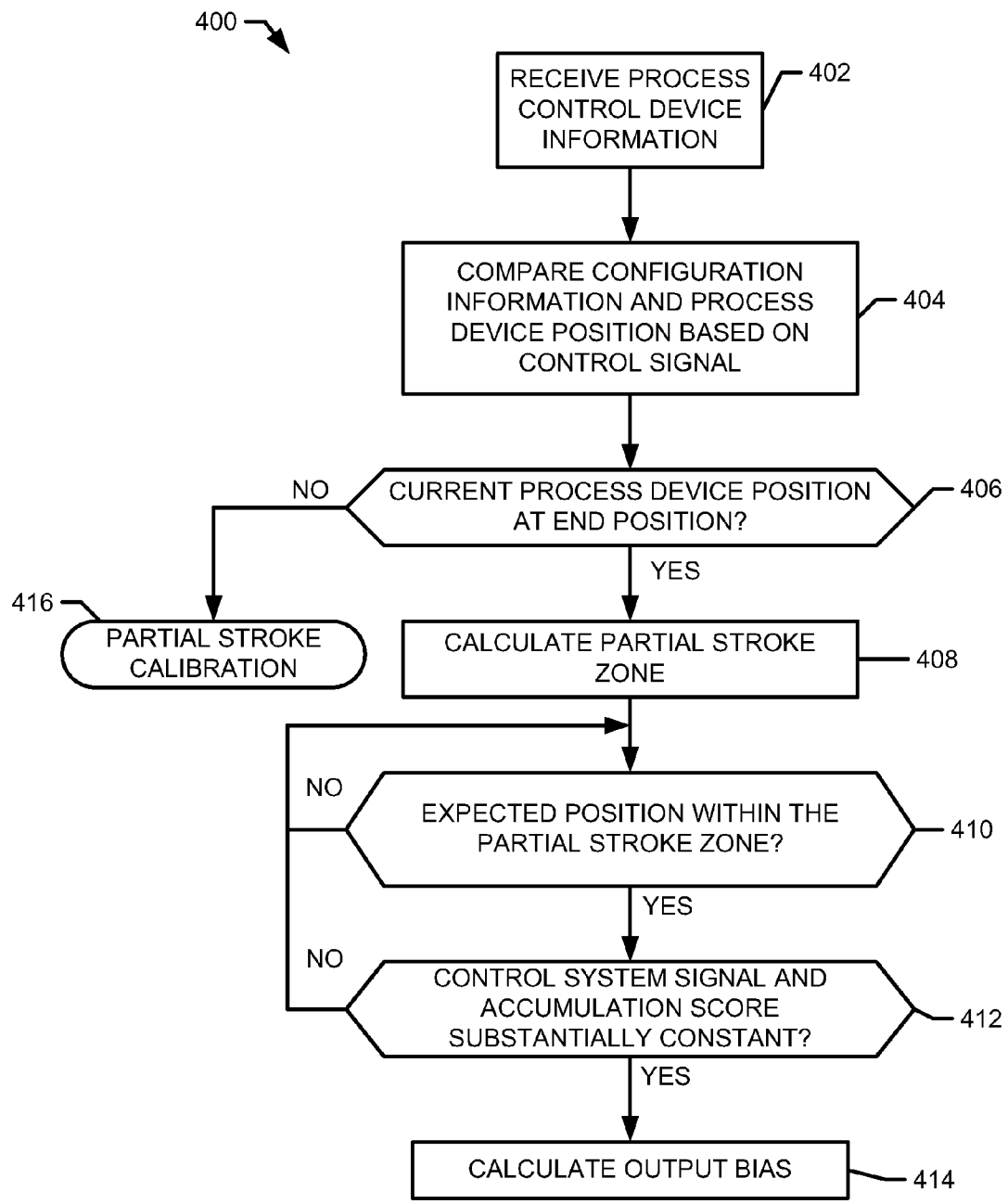
FIG. 4 is a flowchart representative of an example method disclosed herein.
Figure 5:
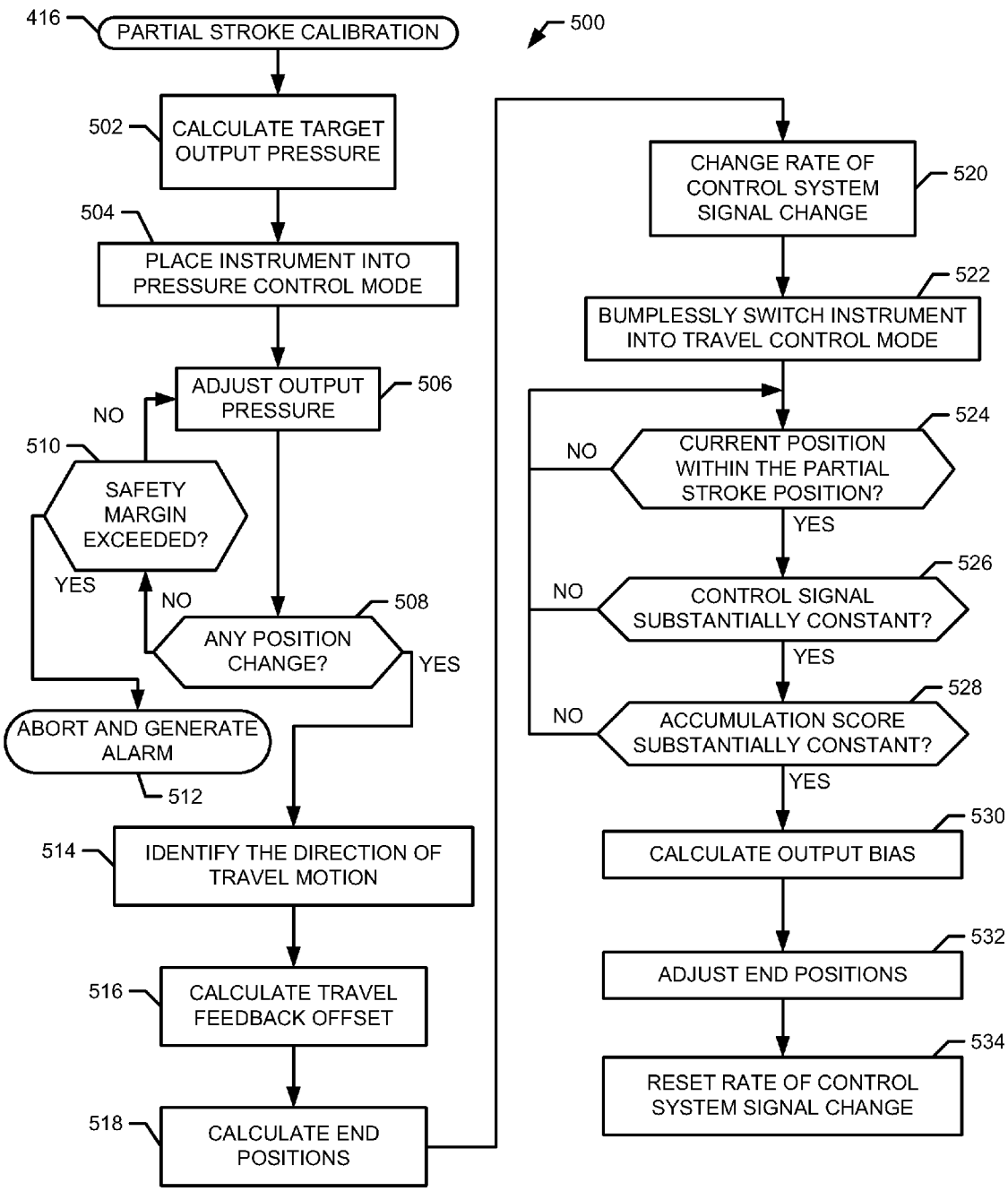
FIG. 5 is a flowchart representative of another example method disclosed herein.

FIGS. 4 and 5 are flowcharts representative of example methods disclosed herein. Some or all of the example methods of FIGS. 4 and 5 may be carried out by a processor, the instrument 104, the controller 106 and/or any other suitable processing device. In some examples, some or all of the example methods of FIGS. 4 and 5 are embodied in coded instructions stored on a tangible machine accessible or readable medium such as a flash memory, a ROM and/or random-access memory RAM associated with a processor. Alternatively, some or all of the example methods of FIGS. 4 and 5 may be implemented using any combination(s) of application specific integrated circuit(s) (ASIC(s)), programmable logic devices(s) (PLD(s)), field programmable logic device(s) (FPLD(s)), discrete logic, hardware, firmware, etc. Also, one or more of the operations depicted in FIGS. 4 and 5 may be implemented manually or as any combination of any of the foregoing techniques, for example, any combination of firmware, software, discrete logic and/or hardware. Further, although the example methods are described in reference to the flowcharts illustrated in FIGS. 4 and 5, many other methods of implementing the example methods may be employed. For example, the order of execution of the blocks may be changed, and/or some of the blocks described may be changed, eliminated, sub-divided, or combined. Additionally, any or all of the example methods of FIGS. 4 and 5 may be carried out sequentially and/or carried out in parallel by, for example, separate processing threads, processors, devices, discrete logic, circuits, etc.

With reference to FIGS. 1-3, an example method or process 400 of FIG. 4 begins at block 402 by receiving information regarding a process control device, such as the example process control device 102. In some examples, the information is collected via a radio frequency identification device (e.g., a tag). At block 404, the received information is compared to previously recorded information to determine whether the information is the same. For example, no process control devices may have changed since the previous calibration and, as a result, calibration is not needed. Using the recorded information and the control system signal from the example controller 106, the position of the process control device is determined. For example, the position may be at an end position (e.g., a fully closed or fully open position) or may be at a partial stroke zone (e.g., between the fully closed and fully open position).

At block 406, the mode controller 206 determines whether the valve is at an end position. If the valve is not at end position, at block 416, the instrument 104 performs a partial stroke calibration. If the valve is at an end position, at block 408, the example instrument 104 operates in a travel control mode and the example position calculator 208 calculates the other end position of the valve. Using the two end positions, the example calculator 208 also calculates a partial stroke zone of the valve (block 408). For example, the position calculator 208 calculates a partial stroke zone within two percent of a mid-stroke position (i.e., the valve position halfway between the two end positions).

At block 410, the example calibrator 212 determines whether an expected position calculated using a control system signal received from the controller 106 is in the partial stroke zone. If the expected position is not in the partial stroke zone, at block 410, the calibrator 212 continues to monitor the expected position. If the expected position is in the partial stroke zone, at block 412, the example calibrator 212 determines whether the control system signal (e.g., the expected position) and the instrument integrator accumulation score are substantially constant. For example, the valve may briefly pass through the partial stroke zone or the integrator 210 may indicate the positions corresponding to the control system signal and the travel feedback signal are not equal (e.g., the integrator 210 is adding the non-zero difference between the two positions to the instrument integrator accumulation score). If the control system signal (e.g., the expected position) and/or the instrument integrator accumulation score is not substantially constant, at block 412, the example calibrator 212 returns to continue monitoring the expected position (block 410).

If the control system signal and the instrument integrator accumulation score are substantially constant, at block 412, the calibrator 212 calculates a new output bias by adjusting a previously stored output bias by the instrument integrator accumulation score and resets the integrator 210 to zero (block 414). The new output bias value is recorded in a storage device such as a non-volatile memory and/or the storage device 216.

An example method or process 500 of FIG. 5 begins at block 502 by calculating a target output pressure. For example, the pressure controller 302 calculates a target output pressure corresponding to the control system signal received from the controller 106. At block 504, the mode controller 206 places the instrument in pressure control mode and initiates the partial stroke calibrator 214 by performing the calibration in pressure control mode.

At block 506, the pressure controller 302 adjusts the output pressure by increasing and/or decreasing the output pressure until a feedback pressure signal corresponding to the output pressure matches the target output pressure corresponding to the control system signal. The pressure controller 302 then slowly increases and decreases the output pressure while observing the travel feedback signal for changes. For example, the pressure controller 302 may increase and/or decrease the output pressure a fraction of the pressure range. At block 508, the position monitor 304 monitors the valve position for each output pressure adjustment. If no change in valve position is detected by the position monitor 304, at block 510, the position monitor 304 determines whether the output pressure exceeds a safety margin. If the output pressure does exceed the safety margin, at block 512, the instrument 104 aborts calibration and communicates an alarm message to the user interface 108. If the output pressure does not exceed the safety margin, the pressure controller 302 adjusts the output pressure at block 506.

If the position monitor 304 detects a change in valve position, at block 514, the position monitor 304 identifies the direction of travel motion when the output pressure is increased and decreased by the pressure controller 302. In some examples, the position monitor 304 also estimates a dead band (e.g., the output pressure range through which no change in the travel feedback signal is observed) and friction of the assembly. For example, the position controller 302 may increase the output pressure until a change is detected by the position monitor 304. The position controller 302 may then decrease the output pressure until a change is detected by the position monitor 304. The pressure controller 302 may record the two output pressures (e.g., store in the storage device 216) as well as the average output pressure based on the two output pressures. At block 516, the travel feedback offset calculator 306 uses the average output pressure to estimate a valve position based on the output pressure. The travel feedback offset calculator 306 also calculates the current valve position based on the travel feedback signal and a default travel offset of zero. The difference between the estimated valve position and the current valve position is recorded by the travel feedback offset calculator 306 as the travel feedback offset.

At block 518, the travel position calculator 308 calculates the two end positions of the valve using the current valve position, the travel feedback offset, stroke length information and the actuator pressure range. At block 520, the cutoff region controller 310 changes the rate of control system signal change to a relatively more gradual rate of change when the control system signal is in the cutoff region. By doing so, while performing a calibration, the valve does not impact into, for example, the valve seat.

At block 522, the mode controller 206 causes the instrument 104 to bumplessly switch to the travel control mode while performing the calibration. At block 524, the calibrator 212 determines whether an expected position calculated using a control system signal is in the partial stroke zone. For example, the calibrator 212 determines whether the control system signal corresponds to a position in the partial stroke zone. If the position is not in the partial stroke zone, the example calibrator 212 continues to monitor the expected position. If the position is in the partial stroke zone, at block 526, the calibrator 212 determines whether the control system signal (e.g., the expected position) is substantially constant. If the control system signal is not substantially constant, the calibrator 212 continues to monitor the expected position of the valve.

If the control system signal is substantially constant, at block 528, the calibrator 212 determines whether the instrument integrator accumulation score is substantially constant. For example, the integrator 210 is adding differences (i.e., non-zero differences) to the instrument integrator accumulation score because the positions corresponding to the travel feedback signal and the control system signal do not match. The integrator 210 sums the difference between the two positions into an instrument integrator accumulation score until the difference equals zero. Once the two positions are equal, the integrator 210 stores the instrument integrator accumulation score. If the instrument integrator accumulation score is not substantially constant, the calibrator 212 continues to monitor the expected position of the valve.

If the instrument integrator accumulation score is substantially constant, at block 530, the calibrator 212 adjusts the output bias by the instrument integrator accumulation score and resets the instrument integrator accumulation score to zero. The new output bias is recorded in the storage device 216. At block 532, the instrument 104 monitors the control system signal until one of the end positions is entered. When the valve travels to the end of travel (e.g., the fully open or fully closed position), the travel feedback signal is used to make adjustments to the calculated end positions. For example, the difference between the calculated end position and the travel feedback signal is used to fine-tune the calculated end position to accurately identify the end of travel. Using the stroke length information for the valve, the other calculated end position is accordingly adjusted. At block 534, the cutoff region controller 310 resets the rate of control system signal change to the original rate (e.g., a sharp transition) and completes the calibration.

Figure 6:
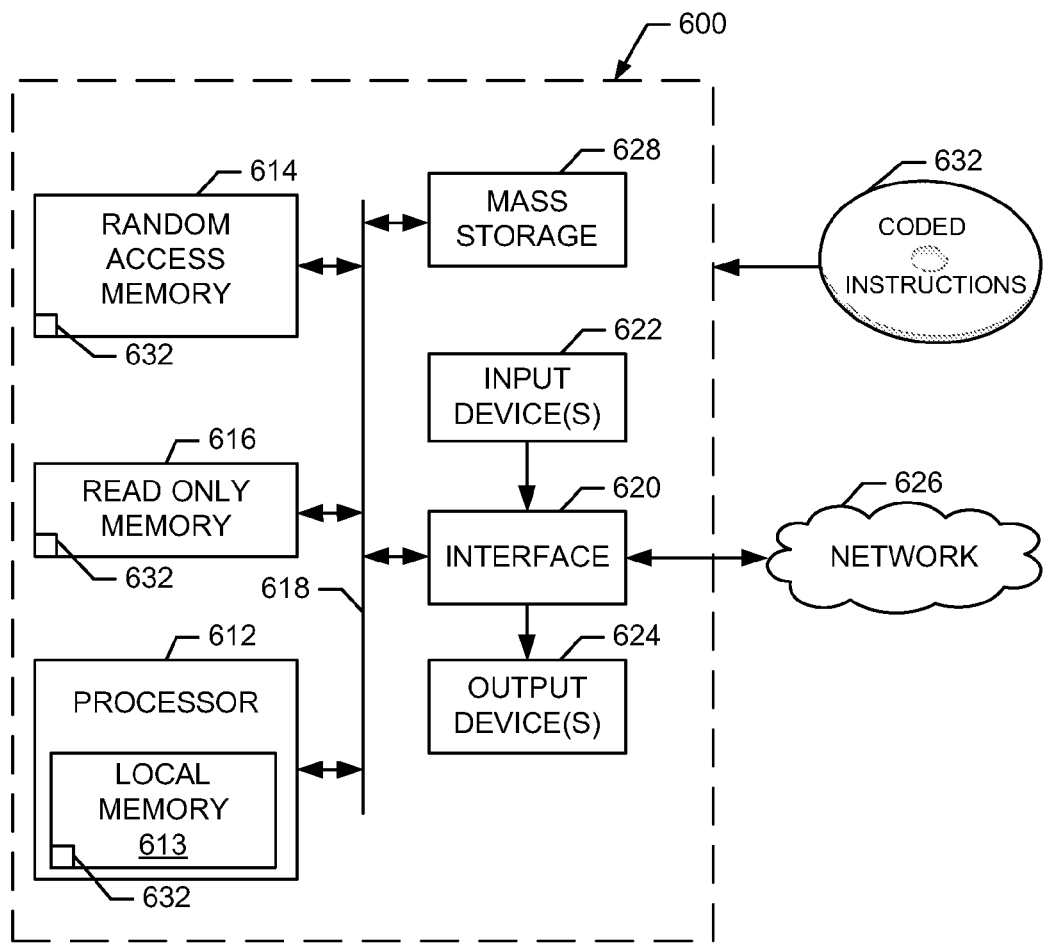
FIG. 6 is a block diagram of an example processing platform capable of executing the example methods of FIGS. 4 and 5 to implement the example instrument of FIGS. 1 and 2.

FIG. 6 is a block diagram of an example computer 600 capable of performing the methods of FIGS. 4 and 5 to implement the apparatus of FIGS. 1-3. The computer 600 can be, for example, a server, a personal computer, a mobile phone (e.g., a cell phone), a personal digital assistant (PDA), an Internet appliance, a DVD player, a CD player, a digital video recorder, a Blu-ray player, a gaming console, a personal video recorder, a set top box, or any other type of computing device.

The system 600 of the instant example includes a processor 612. For example, the processor 612 can be implemented by one or more microprocessors or controllers from any desired family or manufacturer.

The processor 612 includes a local memory 613 (e.g., a cache) and is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS Dynamic Random Access Memory (RDRAM) and/or any other type of random access memory device. The non-volatile memory 616 may be implemented by flash memory and/or any other desired type of memory device. Access to the main memory 614, 616 is controlled by a memory controller.

The computer 600 also includes an interface circuit 620. The interface circuit 620 may be implemented by any type of interface standard, such as an Ethernet interface, a universal serial bus (USB), and/or a PCI express interface.

One or more input devices 622 are connected to the interface circuit 620. The input device(s) 622 permit a user to enter data and commands into the processor 612. The input device (s) can be implemented by, for example, a keyboard, a mouse, a touchscreen, a track-pad, a trackball, is point and/or a voice recognition system.

One or more output devices 624 are also connected to the interface circuit 620. The output devices 624 can be implemented, for example, by display devices (e.g., a liquid crystal display, a cathode ray tube display (CRT), a printer and/or speakers). The interface circuit 620, thus, typically includes a graphics driver card.

The interface circuit 620 also includes a communication such as a modem or network interface card to facilitate exchange of data with external computers via a network 626 (e.g., an Ethernet connection, a digital subscriber line (DSL), a telephone line, coaxial cable, a cellular telephone system, etc.).

The computer 600 also includes one or more mass storage devices 628 for storing software and data. Examples of such mass storage devices 628 include floppy disk drives, hard drive disks, compact disk drives and digital versatile disk (DVD) drives. The mass storage device 628 may implement the local storage device.

Coded instructions 632 of FIGS. 4 and 5 to implement the methods may be stored in the mass storage device 628, in the volatile memory 614, in the non-volatile memory 616, and/or on a removable storage medium such as a CD or DVD.

From the foregoing, it will appreciate that the above disclosed methods, apparatus and articles of manufacture allow automatic calibration of a process control device. As a result, user input is not needed to calibrate the process device thereby reducing the likelihood of a user caused error.

Although certain example methods, apparatus and articles of manufacture have been described herein, the scope of coverage of this patent is not limited thereto. On the contrary, this patent covers all methods, apparatus and articles of manufacture fairly falling within the scope of the claims of this patent.

What is claimed is:

1. A method comprising:
   determining, with a processor, a first position of a process control device is a first end position;
   in response to the first position being the first end position, calculating a second end position of the process control device based on the first end position and configuration information;
   calculating a partial stroke zone of the process control device based on the first end position and the second end position;
   determining when a current position of the process control device is within the partial stroke zone;
   when the current position is within the partial stroke zone, calculating, with the processor, an output bias based on a value indicative of a comparison of the current position to a control signal; and
   changing an output pressure output from the process control device based on the output bias.

2. A method as defined in claim 1, further comprising:
   when the first position is not the first end position, calculating a target output pressure based on the configuration information;
   determining whether a feedback pressure is equal to the target output pressure, wherein the feedback pressure corresponds to the output pressure; and
   changing the output pressure to match the feedback pressure to the target output pressure when the feedback pressure is not equal to the target output pressure.

3. A method as defined in claim 2, further comprising:
   monitoring a change in the current position while adjusting the output pressure;
   in response to the change in the current position, modifying a rate of control signal change when the control signal is in a cutoff region determined using the configuration information; and
   changing the current position based on the rate of control signal change when the control signal is in the cutoff region.

4. A method as defined in claim 3, wherein monitoring the change in the current position further comprises calculating an average signal based on a first feedback pressure and a second feedback pressure, the first feedback pressure collected when the output pressure is increased and the second feedback pressure collected when the output pressure is decreased.

5. A method as defined in claim 4, further comprising estimating a friction level of the process control device based on the first feedback pressure and the second feedback pressure.

6. A method as defined in claim 4, wherein increasing the output pressure further comprises:
   incrementally increasing the output pressure;
   in response to incrementally increasing the output pressure, determining whether the current position changes; and
   when the current position changes, determining a direction of motion.

7. A method as defined in claim 4, wherein decreasing the output pressure further comprises:
   incrementally decreasing the output pressure;
   in response to incrementally decreasing the output pressure, determining whether the current position changes; and
   when the current position changes, determining a direction of motion.

8. A method as defined in claim 3, further comprising providing an alert in response to no change in the current position.

9. A method as defined in claim 1, further comprising:
   calculating a plurality of differences between the current position and the control signal until the current position matches the control signal; and
   summing the plurality of differences to form the value.

10. A method as defined in claim 9, wherein the value indicates an adjustment to correlate the current position to the control signal.

11. A method as defined in claim 1, wherein the configuration information is collected via a radio frequency identification device.

12. A method as defined in claim 1, wherein calculating the output bias further comprises adding the value to a second output bias calculated prior to the output bias.

13. An apparatus comprising:
   a memory;
   a processor coupled to the memory including instructions to cause the apparatus to:
      determine if a first position of a process control device is a partial stroke position of the process control device;
      in response to the first position being the partial stroke position, calculate a target output pressure based on configuration information;
      determine whether the target output pressure is equal to a feedback pressure corresponding to an output pressure output from the process control device;
      calculate a difference between the target output pressure and the feedback pressure; and
      change the output pressure by the difference.

14. An apparatus as described in claim 13, the instructions to further cause the apparatus to:
   monitor a change in a current position of the process control device while adjusting the output pressure;
   in response to the change in the current position, reduce a rate of control signal change when a control signal is in a cutoff region determined using the configuration information; and
   incrementally change the current position based on the rate of control signal change when the control signal is in the cutoff region.

15. An apparatus as described in claim 13, the instructions to further cause the apparatus to:
   when the first position is not the partial stroke position, calculate a second end position of the process control device based on the first end position and the configuration information;
   calculate a partial stroke zone of the process control device based on the first end position and the second end position;
   determine when a current position is in the partial stroke zone; and
   when the current position is in the partial stroke zone, calculate an output bias based on a value indicative of a comparison of the current position to a position corresponding to a control signal.

16. An apparatus as described in claim 15, the instructions to further cause the apparatus to:
   calculate a difference between the current position and the position corresponding to the control signal; and
   add the difference to a calculated value to form a value indicating an adjustment to correlate the current position to the control signal.

17. A tangible computer readable storage medium comprising instructions to cause a machine to:
   determine if a first position of a process control device is a first end position;
   in response to the first position being the first end position, calculate a second end position of the process control device based on the first end position and configuration information;
   calculate a partial stroke zone of the process control device based on the first end position and the second end position;
   determine when a current position of the process control device is within the partial stroke zone; and
   when the current position is within the partial stroke zone, calculate an output bias based on a value indicative of a comparison of the current position to a position corresponding to a control signal.

18. A tangible computer readable storage medium as described in claim 17 to further cause the machine to:
   when the first position is not the first end position, calculate a target output pressure based on the configuration information;
   determine whether a feedback pressure is equal to the target output pressure, wherein the feedback pressure corresponds to an output pressure output from the process control device; and
   change the output pressure to match the feedback pressure to the target output pressure when the feedback pressure is not equal to the target output pressure.

19. A tangible computer readable storage medium as described in claim 17 to further cause the machine to:
   monitor a change in the current position while adjusting the output pressure;
   in response to the change in the current position, modify a rate of control signal change when the control signal is in a cutoff region determined using the configuration information; and
   incrementally change the current position based on the rate of control signal change when the control signal is in the cutoff region.

20. A tangible computer readable storage medium as described in claim 19 to further cause the machine to:
   calculate a plurality of differences between the current position and the position corresponding to the control signal until the current position equals the position corresponding to the control signal; and
   sum the plurality of differences to form the value.

21. A tangible computer readable storage medium as described in claim 20 wherein the value indicates an adjustment to correlate the current position to the position of the control signal.

22. A tangible computer readable storage medium as described in claim 17 to further cause the machine to:
   add the value to a second output bias calculated prior to the output bias.

* * * * *